(12) United States Patent
Wadia et al.

(10) Patent No.: US 8,425,865 B2
(45) Date of Patent: Apr. 23, 2013

(54) METHOD OF SYNTHESIZING PYRITE NANOCRYSTALS

(75) Inventors: Cyrus Wadia, Alexandria, VA (US); Yue Wu, West Lafayette, IN (US)

(73) Assignee: The Regents of the University of California, Oakland, CA (US)

(*) Notice: Subject to any disclaimer, the term of this patent is extended or adjusted under 35 U.S.C. 154(b) by 13 days.

(21) Appl. No.: 13/140,810

(22) PCT Filed: Dec. 17, 2009

(86) PCT No.: PCT/US2009/068432
§ 371 (c)(1),
(2), (4) Date: Aug. 31, 2011

(87) PCT Pub. No.: WO2010/080487
PCT Pub. Date: Jul. 15, 2010

(65) Prior Publication Data
US 2011/0305626 A1     Dec. 15, 2011

Related U.S. Application Data

(60) Provisional application No. 61/139,485, filed on Dec. 19, 2008.

(51) Int. Cl.
*C01G 49/12* (2006.01)

(52) U.S. Cl.
USPC ........................................ 423/138; 423/561.1

(58) Field of Classification Search ................. 423/138, 423/561.1; 977/773, 896
See application file for complete search history.

(56) References Cited

U.S. PATENT DOCUMENTS 7,410,625 B2 * 8/2008 Sun .............................. 423/138
2006/0039850 A1 * 2/2006 Jun et al. .................... 423/561.1

* cited by examiner

*Primary Examiner* — Timothy Vanoy
(74) *Attorney, Agent, or Firm* — Technology Transfer and Intellectual Property Management Department (57) ABSTRACT

A method of synthesizing pyrite nanocrystals is disclosed which in one embodiment includes forming a solution of iron (III) diethyl dithiophosphate and tetra-alkyl-ammonium halide in water. The solution is heated under pressure. Pyrite nanocrystal particles are then recovered from the solution.

29 Claims, 6 Drawing Sheets

METHOD OF SYNTHESIZING PYRITE NANOCRYSTALS

RELATED APPLICATIONS

This application is the national phase application of International application number PCT/US2009/068432, filed Dec. 17, 2009, which claims priority to and the benefit of U.S. Provisional Application No. 61/139,485, filed on Dec. 19, 2008, which is hereby incorporated by reference in its entirety.

STATEMENT OF GOVERNMENT SUPPORT

This invention was made with government support under Contract No. DE-AC02-05CH11231 awarded by the U.S. Department of Energy. The government has certain rights in this invention.

FIELD OF THE INVENTION

The present invention relates to the field of material science and, more particularly, to pyrite and forming nanocrystals.

BACKGROUND OF THE INVENTION

Iron pyrite, sometimes known as fool's gold, is one of the most abundant compounds found on the earth's surface. Pyrite is an iron (II) disulfide with an NaCl type cubic lattice structure and is weakly paramagnetic. Historically, the investigation of pyrite dates back to the mid 19th century with a focus of interest in biological applications. Despite its simple structure, pyrite has a low symmetry (space group Pa3), and therefore it is chiral making it biologically active. Generally speaking, iron based sulfides are an integral component of the earth's geological sulfur cycle. So, there are numerous iron sulfide compounds that form naturally. Several of the more common compounds include: marcasite, troilite, greigite, mackinawite, and smythite. Marcasite is the closest analog to pyrite, as it is also an iron (II) disulfide. The only structural difference is that it is orthorhombic and not cubic. This gives rise to several key differences in optical properties, which highlight the importance of phase purity when considering pyrite as a material for photovoltaics.

Pyrite is vastly different and in most ways superior in both bandgap energy and absorption coefficient $\alpha$ over most conventional semiconducting compounds considered for photovoltaics. Coupled with its environmental compatibility and earth abundance it's a natural candidate for further investigation. The bandgap of pyrite is at 0.95 eV. This is an indirect transition but there is a direct transition at ~1.03 eV which becomes the energy gap of primary interest. The absorption coefficient $\alpha$ over the energy spectrum from wavelengths of $\lambda=300$ nm to $\lambda=750$ nm is $a \approx 3.3 \times 10^5$ cm$^{-1}$ which yields a 30 nm absorption length. By the Beer-Lambert Law, where $I(\lambda) = I_o e^{-\alpha t}$, one pass through a single absorption length will enable a material to absorb ~63% of the incident photon energy from the sun. Assuming internal reflection and a back reflecting surface as is common in most photovoltaics, photons will have two passes through 30 nm giving an ~87% theoretical absorption. In dramatic comparison, crystalline silicon requires a four order of magnitude larger film thickness (i.e. ~300,000 nm) to achieve the same absorption. Pyrite is a good choice for further investigation, because its lower thickness for an absorption similar to that of silicon solves a material consumption issue by minimizing the input of material for TWh (terawatt-hour) scale production, and reduces bulk recombination due to shorter diffusion lengths. These two features however, are dependant on the ability to fabricate a 30 nm film.

In addition to the ideal physical and optical properties of pyrite as a candidate for photovoltaic material, it has the added benefit of being a sustainable choice. It is believed that pyrite has the ability to exceed annual global electricity production by several orders of magnitude using only a fraction of the material available. Furthermore, the mining of it is at such a low cost, it could become the least expensive semiconducting material for any application. Lastly, the material is non-toxic and naturally occurring, which delivers significant advantage over modern thin film photovoltaic materials, like cadmium telluride. The remaining challenge and opportunity for pyrite is throughput and rate of production. By virtue of being earth abundant, the real question is not in the production of raw materials but in the processing of that material.

Synthetic work on pyrite has been an active area of research for many years. Prior work in this field may be categorized into thin film growth and pyrite powder synthesis. Thin film work has ranged from: MOCVD, sputtering, electrodeposition, and sulfurization. Techniques exploring pyrite powder growth have included: hydrothermal, solvothermal, and inorganic colloidal approaches.

Perhaps the most significant and notable work on pyrite photovoltaics dates back to the early 1980's. Work led by Helmut Tributsch from the Hahn-Meitner-Instituit in Germany progressed toward working pyrite photovoltaic devices of 2.8% power conversion efficiency. They experimented with both a dye sensitized architecture and a homojunction where pyrite was doped n and p by varying concentrations of cobalt. Their best reported devices had an $J_{sc}$ of 42 mA/cm$^2$ and an $V_{oc}$ of 200 mV as taught by Ennaoui et al. in, Preparation of iron disulfide and its use for solar energy," in Proc. of the First World Energy Congress, 1990. Although, they describe a high surface defect density as the root cause for lower than expected device performance, its perhaps more likely that material purity could be playing a role, especially given the low reported open circuit voltage values. Typically the techniques employed required a high temperature process step. Yet at elevated temperatures, segregation of iron and sulfur species is promoted, which could change the stoichiometry and phase of the material being deposited. This suggests purity has been a key hurdle in their pyrite work. Tributsch and his colleagues identified this as an issue and surmised that the quality of pyrite cannot be improved by high temperature treatments and therefore suggest passivation techniques to work with lower quality material in Alternatt et al., "Specifying targets of future research in photovoltaic devices containing pyrite (FeS$_2$) by numerical modelling," in Solar Energy Materials and Solar Cells, 2002, 71(2), 181-95.

Other groups went in a different direction in the 1980's and investigated solution growth techniques for pyrite powders as opposed to direct deposition of pyrite films. In these reactions, various salts bearing the cation Fe$^{+2}$ or Fe$^{+3}$ were reacted with polysulfide compounds, often in the presence of H$_2$S gas. Reactions carried out for as many as 24 hours at 100° C. yielded favorable results in that pyrite was formed. Yet little characterization on the purity of these growths was provided. This may be explained by the primary objective of these studies, which was to establish new insights into the mechanisms by which pyrite forms in nature. So, the value or appropriateness of these methods for photovoltaics appears to be limited.

While much of this work from the 1980's has either persisted quietly or been discontinued altogether, there has been a resurgence in the field of synthetic approaches for pyrite powder formation. An important discovery made by Rickard and Luther was that crystal growth of pyrite type sulfides of 3d-transition metals heavier than Ni as well as tellurides of Fe and Co are almost impossible to synthesize by using ordinary methods. Pyrite materials with more electrons than $FeS_2$ have an antibonding character; thereby making formation progressively more difficult and perhaps requiring higher pressures during formation techniques. This was a necessary observation during this earlier phase of work on traditional inorganic synthetic approaches to open the door for new high-pressure techniques, namely hydrothermal and solvothermal reactions.

Much of this emerging work has been performed in non-U.S. research tabs. There are a number of publications that discuss new hydrothermal and solvothermat pathways to cubic pyrite by use of a pressurized autoclave reactor. For example, see: Chen et al., *Low-temperature hydrothermal synthesis of transition metal dichalcogenides*, Chem. Mater. 2001, 13, 802-805; Chen et al., *Single-source approach to cubic $FeS_2$ crystallites and their optical and electrochemical properties*, Inorg. Chem. 2005, 44, 951-954; Kar et al., *Solvothermal synthesis of nanocrystalline $FeS_2$ with different morphologies*, Chemical Physics Letters, 2004, 398, 22-26; Kar et al., *Wet chemical synthesis of iron pyrite and characterization by Mössbauer Spectrorscopy*, Materials Letters, 2004, 38, 2886-2889; and Xuefeng et al., *Solvothermal synthesis and morphological control of nanociystalline $FeS_2$*, Materials Letters, 2001, 48, 109-111. Yet, there are concerns with these studies involving both purity and morphology of the resulting product. A review of this work reveals a general inconsistency in reported XRD (x-ray diffraction) spectra. On close inspection, many of the XRD patterns presented are of either low quality or do not correspond to pure phase pyrite. This raises some doubts in the purity of the materials synthesized.

SUMMARY OF THE INVENTION

The present invention provides a method for the synthesizing of pyrite nanocrystals. According to an embodiment, the method includes forming a solution of iron (III) diethyl dithiophosphate and tetra-alkyl-ammonium halide in water. The solution is heated under pressure. Pyrite nanocrystal particles are then recovered from the solution.

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

The present invention is a method of synthesizing pyrite ($FeS_2$) nanocrystals, in which a molecular precursor in the presence of a surfactant undergoes thermal decomposition in a hydrothermal reaction. (It is noted that as used herein pyrite is iron pyrite.) According to an embodiment, the method includes forming an aqueous solution of iron (III) diethyl dithiophosphate or a radical thereof or a combination of both as the molecular precursor and tetra-alkyl-ammonium halide as the surfactant. This solution is heated under pressure.

In an embodiment, the tetra-alkyl-ammonium halide is alkyl-trimethyl-ammonium halide such as hexadecyl-trimethyl-ammonium halide. The hexadecyl-trimethyl-ammonium halide is also known as cetrimonium halide (e.g., cetrimonium bromide or CTAB). In other embodiments, a length of the hexadecyl alkyl group of the cetrimonium halide is increased or decreased and may include branching. In yet other embodiments, one or more of the methyl groups of the alkyl-trimethyl-ammonium halide are replaced with other alkyl groups.

In an embodiment, the solution is heated to a temperature greater than 150° C. In another embodiment, the solution is heated to a temperature of at least about 180° C. In yet another embodiment, the solution is heated to a temperature of at least about 190° C. In an embodiment, the pressure during the heating is at least about 150 psi. In another embodiment, the pressure during the heating is at least about 165 psi. In yet another embodiment, the pressure during the heating is at least about 180 psi.

In an embodiment, the iron (III) diethyl dithiophosphate is formed in a reaction between iron (III) chloride and diethyl dithiophosphate ammonium salt. Such a reaction may be initiated by mixing aqueous solutions of the iron (III) chloride and the diethyl dithiophosphate ammonium salt. The resulting solution that includes the iron (III) diethyl dithiophosphate may be mixed with an aqueous solution of the tetra-alkyl-ammonium halide to form the aqueous solution of the molecular precursor and the surfactant. Or, the resulting solution may be dried to form iron (III) diethyl dithiophosphate powder. Later, an aqueous solution of the iron (III) diethyl dithiophosphate may be formed by dissolving the powder in water. This later solution may then be mixed with the aqueous solution of the tetra-alkyl-ammonium halide. The aqueous solution of the tetra-alkyl-ammonium halide may be agitated or sonicated prior to mixing with the aqueous solution of the iron (III) diethyl dithiophosphate. The solution of the iron (III) diethyl dithiophosphate and the tetra-alkyl-ammonium halide may be agitated or sonicated during mixing or after mixing.

In an embodiment, the solution may have a ph of 7. In another embodiment, a ph of the solution may be adjusted to a value within a range of about 3 and above. For example, a non-reactive acid such as acetic acid or a non-reactive base may be added to the solution.

Example

The present invention will be described in greater detail by way of a specific example. The following example is offered for illustrative purposes, and is intended neither to limit nor define the invention in any manner.

Materials and Methods

All reagents for the work presented here were purchased from Aldrich and used without further purification. Dilute solutions of the starting precursors were prepared with ultra-pure deionised water. All stock solutions were prepared and stored in ambient conditions.

Figure 9:
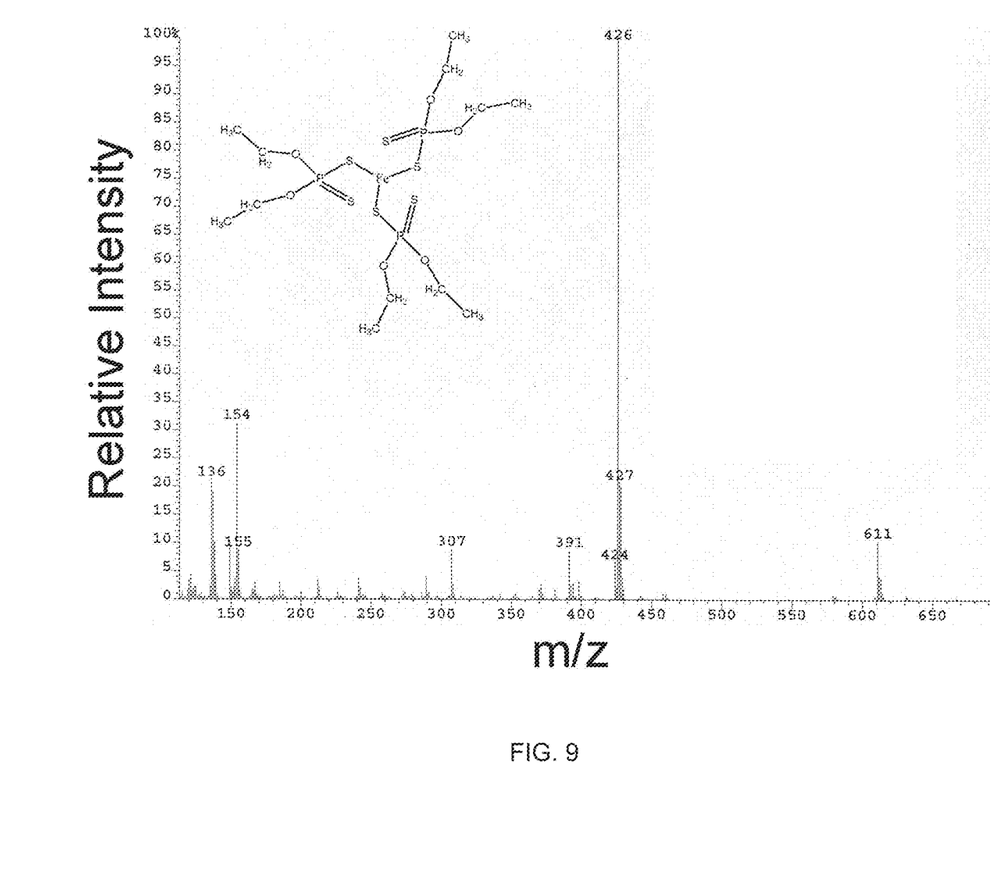
FIG. 9 provides molecular structure and mass spectrum of iron (III) diethyldithiophosphate produced in an experiment in accordance with an embodiment of the present invention.

The iron source for the reaction presented here was iron (III) chloride. A 0.08M solution was prepared by dissolving 6.5 g of iron (III) chloride in 500 ml of water. The sulfur source was diethyl dithiophosphate ammonium salt with chemical formula $(C_2H_5O)_2P(S)SNH_4$ or A 0.12M solution was prepared by dissolving 11.2 g in 500 ml of water. This dissolution was rapid and formed a colourless clear solution. The iron (III) chloride and the diethyl dithiophosphate ammonium salt reacted to produce iron (III) diethyl dithiophosphate. FIG. 9 shows the molecular structure of the iron (III) diethyl dithiophosphate and the mass spectrum of iron (III) diethyl dithiophosphate produced here.

The surfactant was cetrimonium bromide (CAB) with chemical formula $((C_{16}H_{33})N(C_{1-3})_3Br)$ or The surfactant was also prepared as a 0.08M solution, CTAB is only slightly soluble in water so the stock solution was a cloudy white suspension. Prior to any reaction, the stock solution was sonicated for 5 minutes and agitated with a stirring rod for approximately 10 minutes.

Figure 1:
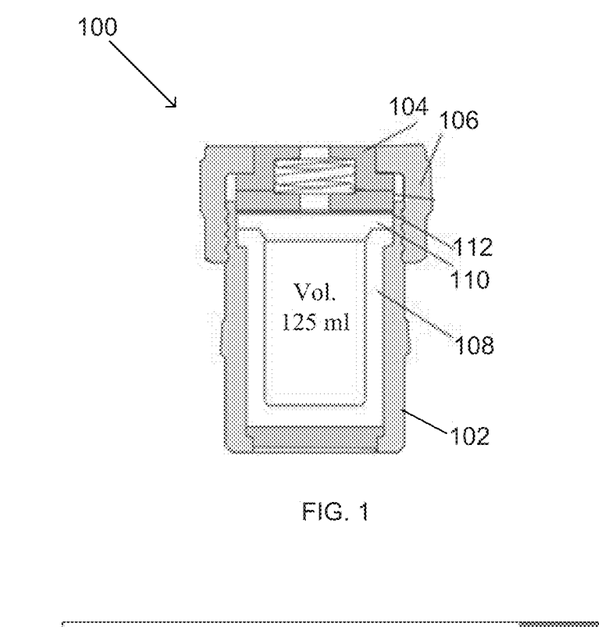
FIG. 1 illustrates a reactor employed in experiments in accordance with embodiments of the present invention.

A reactor similar to the reactor used here is illustrated in FIG. 1. The reactor 100 is a stainless steel acid digestion bomb that included a 125 ml teflon liner and cap in which the reactants were added. The reactor 100 included a body 102, a sprung-loaded lid 104, and a threaded fastening ring 106, all made of stainless steel. When assembled, the sprung-loaded lid 104 is held to the body by the threaded fastening ring 106. The reactor 100 encloses the teflon liner 108 and the teflon cap 110. The sprung loaded lid 104 applies pressure to the teflon cap 100 via a copper washer 112.

In a typical synthesis of $FeS_2$, 20 ml of 0.08M iron(III) chloride, 20 ml of 0.08M CTAB, and 40 ml of 0.12M diethyl dithiophosphate were added in series to the teflon liner 108 while a stir bar was used to agitate the mixture. The resulting solution turned a deep green colour and if left to stand for an hour without a temperature increase, would slowly precipitate a complex much like a single source precursor. The teflon liner 108 and the cap 110 were added to the reactor which was sealed air tight and loaded into an oven set to 200° C. The reaction was maintained at this temperature for a minimum of tour hours and a maximum of 48 hours. Multiple experiments showed no significant variation in product between the long and shorter runs.

After a slow cooling in ambient conditions, the reactor was opened and liner removed. Typically the supernatant was a murky water color while all the product had precipitated to the bottom of the reactor. The supernatant was decanted and discarded. The precipitate in the bottom of the reactor was scraped and rinsed with toluene and poured into a separate vial. Particles were then precipitated by centrifuge at 9000 rpm for ~5 minutes. No additional solvent was necessary to crash out particles in suspension. In a typical cleaning process, this was repeated twice before all the particles were re-suspended in toluene, chloroform, or methanol.

Results

The purity of the synthesized pyrite particles was determined using powder x-ray diffraction (XRD), x-ray photoelectron spectroscopy (XPS), and energy dispersive x-ray spectroscopy (EDS). XRD is a technique used to characterize the crystallographic structure, crystallite size (grain size), and preferred orientation in polycrystalline or powdered solid samples. For the experiments discussed here, it was used to check that the iron sulfide phase of a sample was cubic pyrite. XPS is a quantitative spectroscopic technique that measures the elemental composition, empirical formula, chemical state and electronic state of the elements that exist within a material. XPS can confirm that the only iron valence in the powder produced is an Fe—S bond. EDS can provide quantitative analysis of elemental composition with a sampling depth of 1-2 microns. Elemental analysis was used to obtain atomic composition of an entire particle.

Figure 2:
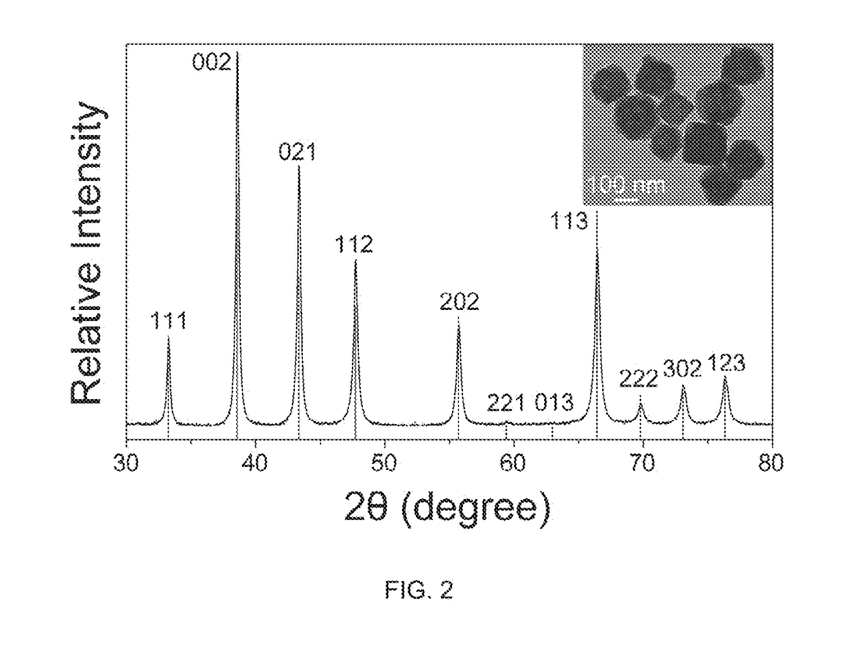
FIG. 2 provides XRD (x-ray diffraction) results of pyrite produced in an experiment in accordance with an embodiment of the present invention and the inset is a TEM (transmission electron microscope) image of pyrite nanocrystals produced in an experiment in accordance with an embodiment of the present invention.

XRD results are shown in FIG. 2. The spectrum is that recorded from a sample synthesized as discussed above and the vertical lines are peak location and intensity of cubic pyrite (JCPDS03-065-1211). This demonstrated both an absolute pure and crystalline cubic pyrite synthesized using the method presented here.

Figure 3:
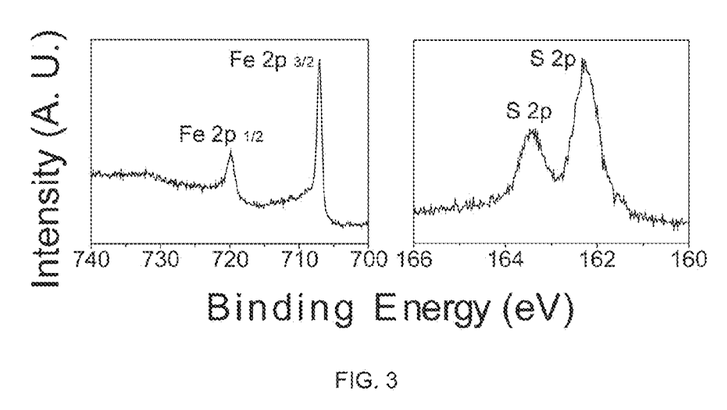
FIG. 3 provides XPS (x-ray photoelectron spectroscopy) results of pyrite produced in an experiment in accordance with an embodiment of the present invention.

XPS data, which is shown in FIG. 3, is equally conclusive. The location of the two Fe peaks shows that iron is bonded only to sulfur. These results also show a higher carbon signal than the baseline, which may suggest that CTAB ligands are bound to the surface. An interesting feature in this data is that the sample appears to be sulfur rich. This may be due to additional phosphate salts still in the sample that were not reacted.

Figure 4:
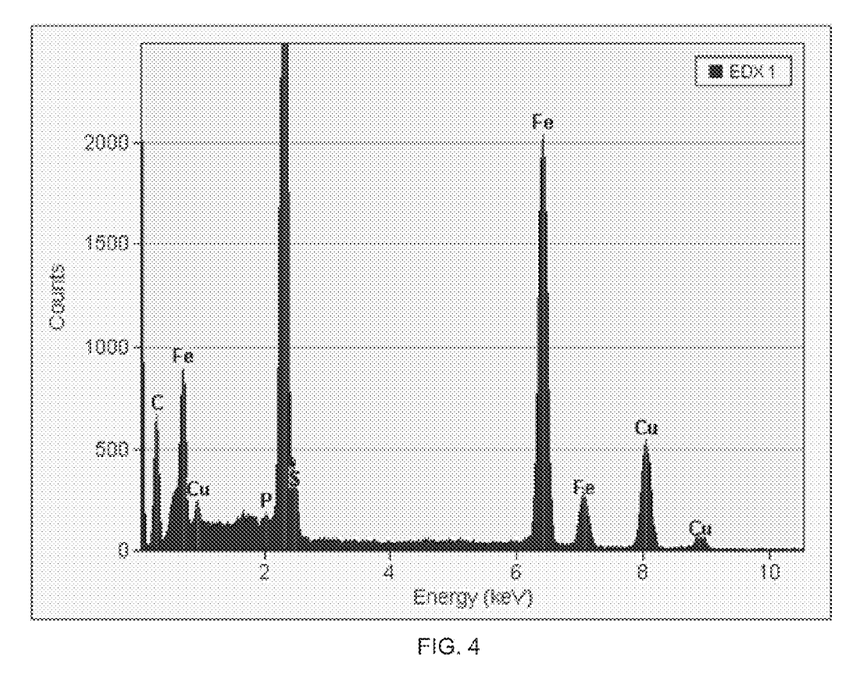
FIG. 4 provides EDS (energy dispersive x-ray spectroscopy) results of pyrite produced in an experiment in accordance with an embodiment of the present invention.

The EDS data as shown in FIG. 4 shows similar purity, where the dominant elemental species are iron and sulfur. The peaks from Cu in the figure are due to the TEM grid on which the sample was deposited.

These three experiments validate the synthesis and confirm that a novel approach has been developed for forming pure phase crystalline pyrite.

Figure 5:
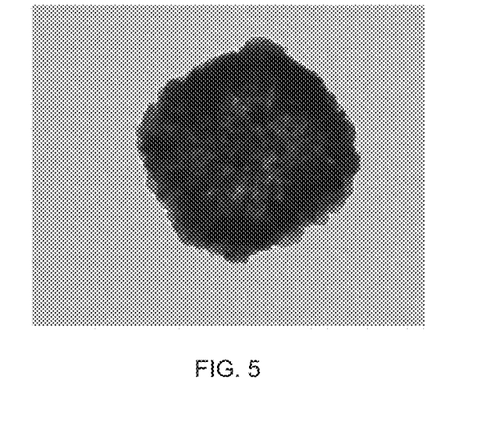
FIG. 5 is a TEM image of pyrite produced in an experiment in accordance with an embodiment of the present invention.
Figure 6:
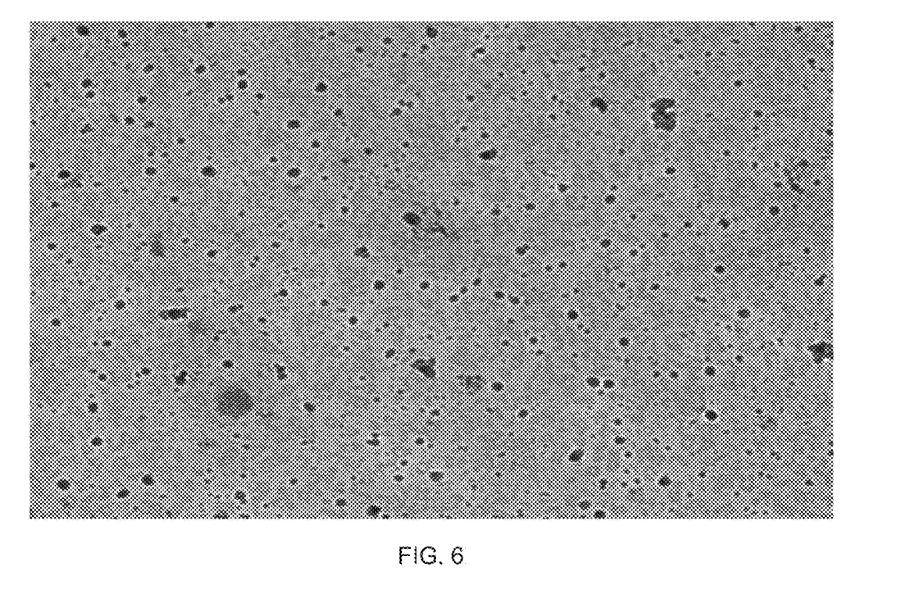
FIG. 6 is a TEM image of pyrite particles produced in an experiment in accordance with an embodiment of the present invention.

The majority of the particles produced are insoluble in either water or an organic solvent. FIG. 5 shows a TEM image of the typical synthesis. The reaction produces large aggregated particles ranging in size between 100 nm and 500 nm. Interestingly, it appears these aggregates may actually be composed of smaller 5 nm to 10 nm irregular shaped particles similar to the morphology discovered in work from the early 1980's. Some time was spent trying to break these aggregates apart by sonication and agitation, but to no avail. However, several reactions did produce non-aggregated irregular shaped particles as shown in FIG. 6. It was possible to suspend these particles indefinitely in water until centrifuged at ~1000 rpm at which point the particles crashed out. The XRD on these smaller particles was consistent with other syntheses of pyrite discussed here so these were used for taking absorption spectra without significant scattering and reflection. By taking the absorption spectra of this material, it was possible to further characterize the material and its optical properties.

Figure 7:
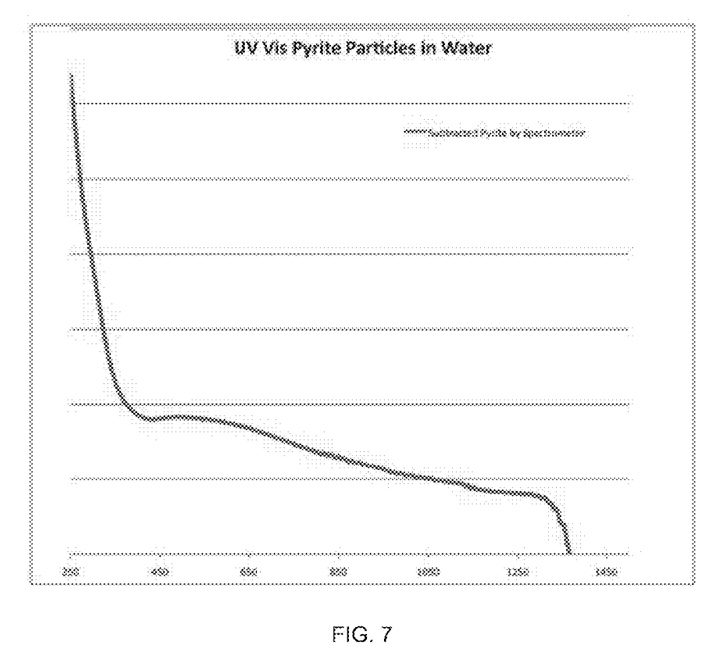
FIG. 7 provides results of absorption spectra measurements of pyrite produced in an experiment in accordance with an embodiment of the present invention.
Figure 10:
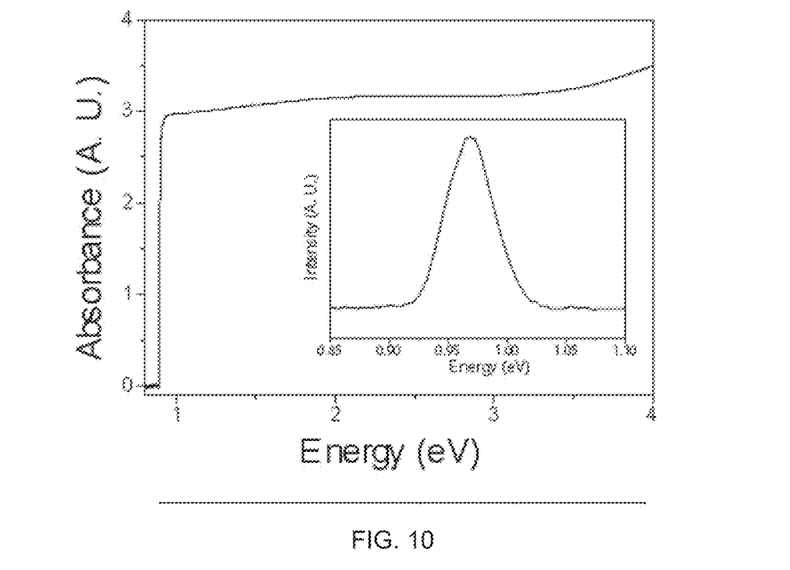
FIG. 10 provides UV-visible absorption spectra and photoluminescence spectrum of pyrite nanocrystals produced in an experiment in accordance with an embodiment of the present invention.

The absorption spectrum as a function of wavelength of pyrite nanocrystals produced here is shown in FIG. 7. It resembles absorption spectra of pyrite reported in earlier work. It has the characteristic absorption turn on at a $\lambda \sim 1360$ nm which corresponds to an energy gap of 1.06 eV. This is the lowest energy direct optical transition for cubic pyrite that is expected, matching well with the expected bandgap energy. UV-visible absorption spectrum and photoluminescence (the inset) of pyrite nanocrystals produced here as functions of photon energy are shown in FIG. 10. The UV-visible absorption spectrum shows a characteristic absorption turned on at 0.89 eV, which results from the strong absorption coefficient of pryirte ($3.3 \times 10^5$ cm$^{-1}$), and matches well with the lowest energy direct transition for pyrite. Photoluminescence measurements show a single peak centered at 0.97 eV with a full-width at half maximum of 0.05 eV.

Figure 11:
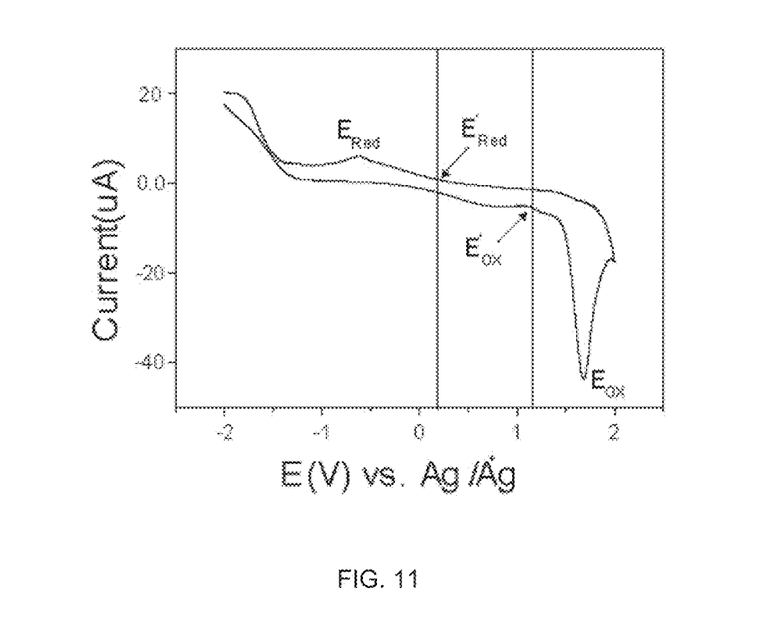
FIG. 11 provides CV spectrum of pyrite nanocrystals produced in an experiment in accordance with an embodiment of the present invention.

CV (cyclic voltammetry) is used to identify a material's HOMO energy level (or ionization potential $I_p$) and the LUMO energy level (or electron affinity $E_a$) from onset oxidation potential ($E_a$) and onset reduction potential ($E_{red}$), respectively. FIG. 11 provides the CV spectrum of pyrite nanocrystals produced here. It shows conduction and valence band edges that are estimated to be roughly −4.9 eV and −5.9 eV, respectively, with bandgap around 1 eV.

After achieving the pure phase pyrite, the majority of the focus was on controlling the particle morphology in hopes of a soluble particle from which thin films could be deposited on glass or plastic substrates. This would be necessary to make photovoltaic devices with a low production cost.

Figure 8A:
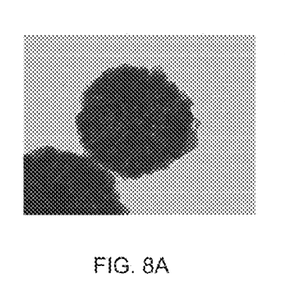
FIG. 8A, FIG. 8B, and FIG. 8C are TEM images of pyrite produced in experiments in accordance with embodiments of the present invention in which an amine was added in proportion with Fe to a solution of a molecular precursor and a surfactant in ratios of amine to Fe of 1:1, 2:1, and 3:1, respectively.
Figure 8B:
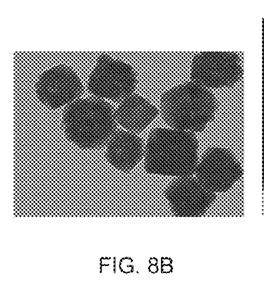
Figure 8C:
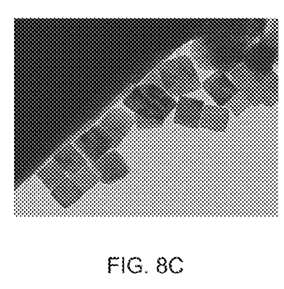

Over 500 synthetic variations were tried in order to isolate the parameters that may provide insight into the mechanisms and nature of our synthesis. One set of experiments with different amines showed a promising result. Adding olyelamine to the reaction in a 1:1 ratio with iron provided a degree of shape control in which the particles and aggregates appeared more faceted. Yet, as the amine concentration was increased up to a 3:1 ratio to iron, the phase shifted from pure pyrite to a mixed phase of pyrite, marcasite, and a trace amount of other iron sulfides, FIG. 8A, FIG. 8B, and FIG. 8C show this shift in particle morphology in which the particles in FIG. 8A were synthesized with a 1:1 ratio of oleylamine to iron and maintain a pure pyrite phase, the particles in FIG. 8B were synthesized in a 2:1 ratio, and the particles in FIG. 8C were synthesized in a 3:1 1 ratio and lose the pure pyrite phase.

During this experimental work, it has become clear that the reaction cannot proceed without addition of a tetra-alkyl-ammonium halide (e.g. CTAB). The initial presumption was that the CTAB was a surfactant promoting growth by formation of micelles and perhaps even binding to the surface of the particles. Therefore, by changing the carbon chain length from nineteen to 30+, it was expected that less aggregation would be seen. In fact, no noticeable change or difference was observed. So another explanation is that the halogen carrying a −1 charge acts as some form of functional group to initiate or promote the reaction. To test this hypothesis the use of different halides were employed. The CTAB was replaced with both CTAC and CTAI, essentially the identical molecule with a Cl and I ion instead of Br. The results showed identical phase and morphology.

CONCLUSION

The above specific description is meant to exemplify and illustrate the invention and should not be seen as limiting the scope of the invention, which is defined by the literal and equivalent scope of the appended claims. Any patents or publications mentioned in this specification are indicative of levels of those skilled in the art to which the patent or publication pertains as of its date and are intended to convey details of the invention which may not be explicitly set out but which would be understood by workers in the field. Such patents or publications are hereby incorporated by reference to the same extent as if each was specifically and individually incorporated by reference, such incorporation being for the purpose of further describing and enabling the method or material referred to.

What is claimed is:

1. A method of synthesizing pyrite nanocrystals comprising:
   forming a solution of a molecular precursor and tetra-alkyl-ammonium halide in water;
   heating the solution under pressure; and
   recovering pyrite nanocrystal particles from the solution.

2. The method of claim 1 wherein the tetra-alkyl-ammonium halide is alkyl-trimethyl-ammonium.

3. The method of claim 2 wherein an alkyl group of the alkyl-trimethyl-ammonium halide is ethyl.

4. The method of claim 2 wherein an alkyl group of the alkyl-trimethyl-ammonium halide is hexadecyl-trimethyl-ammonium halide.

5. The method of claim 4 wherein a halide group of the hexadecyl-trimethyl-ammonium halide is selected from the group consisting of fluoride, chloride, bromide, and iodide.

6. The method of claim 1 wherein the molecular precursor is selected from a group consisting of iron (III) diethyl dithiophosphate, a radical thereof, and a combination of both the iron (III) diethyl dithiophosphate and the radical thereof.

7. The method of claim 6 further comprising forming the molecular precursor in a reaction between iron (III) chloride and diethyl dithiophosphate ammonium salt.

8. The method of claim 7 wherein forming the molecular precursor comprises:
   forming a precursor solution of the iron (III) chloride and the diethyl dithiophosphate ammonium salt; and
   drying the solution.

9. The method of claim 8 wherein forming the solution comprises adding the molecular precursor and the tetra-alkyl-ammonium halide to the water.

10. The method of claim 7 wherein forming the solution comprises:
    forming an aqueous precursor solution of the iron (III) chloride and the diethyl dithiophosphate which react to produce the iron (III) diethyl dithiophosphate; and
    adding the tetra-alkyl-ammonium halide to the aqueous precursor solution.

11. The method of claim 6 wherein forming the solution comprises:
    forming a precursor solution of the molecular precursor in the water;
    forming a tetra-alkyl-ammonium halide solution of the tetra-alkyl-ammonium halide and the water; and mixing the precursor and tetra-alkyl-ammonium halide solutions.

12. The method of claim 11 further comprising agitating the tetra-alkyl-ammonium halide solution prior to mixing the precursor and tetra-alkyl-ammonium halide solutions.

13. The method of claim 12 further comprising agitating the solution while mixing the precursor and tetra-alkyl-ammonium halide solutions.

14. The method of claim 11 further comprising sonicating the tetra-alkyl-ammonium halide solution prior to mixing the precursor and tetra-alkyl-ammonium halide solutions.

15. The method of claim 14 further comprising sonicating the solution while mixing the precursor and tetra-alkyl-ammonium halide solutions.

16. The method of claim 1 wherein heating the solution comprises heating the solution to a temperature above 150° C.

17. The method of claim 1 wherein heating the solution comprises heating the solution to a temperature of at least about 180° C.

18. The method of claim 1 wherein heating the solution comprises heating the solution to a temperature of at least about 200° C.

19. The method of claim 1 wherein the pressure during heating the solution reaches at least about 150 psi.

20. The method of claim 1 wherein the pressure during heating the solution reaches at least about 165 psi.

21. The method of claim 1 wherein the pressure during heating the solution reaches at least about 180 psi.

22. The method of claim 1 wherein a ph of the solution is within the range of 3 and above.

23. The method of claim 1 wherein forming the solution further comprises adding an amine to the solution.

24. The method of claim 23 wherein the amine is olyelamine.

25. The method of claim 2 wherein an alkyl group of the alkyl-trimethyl-ammonium halide is a carbon chain alkyl that is longer than ethyl.

26. The method of claim 2 wherein an alkyl group of the alkyl-trimethyl-ammonium halide is a carbon chain alkyl that is longer than hexadecyl-trimethyl-ammonium.

27. The method of claim 7 wherein forming the solution comprises:
    forming an aqueous precursor solution of the iron (III) chloride and the diethyl dithiophosphate which react to produce the radical thereof; and
    adding the tetra-alkyl-ammonium halide to the aqueous precursor solution.

28. The method of claim 12 further comprising agitating the solution after mixing the precursor and tetra-alkyl-ammonium halide solutions.

29. The method of claim 14 further comprising sonicating the solution after mixing the precursor and tetra-alkyl-ammonium halide solutions.

* * * * *